(12) United States Patent
Hearld

(10) Patent No.: US 6,565,625 B2
(45) Date of Patent: May 20, 2003

(54) METHOD AND APPARATUS FOR SEPARATION AND RECOVERY OF A LIQUID FROM A GAS STREAM

(76) Inventor: Jackie Hearld, P.O. Box 3088, Huntington, WV (US) 25702

(*) Notice: Subject to any disclaimer, the term of this patent is extended or adjusted under 35 U.S.C. 154(b) by 0 days.

(21) Appl. No.: 09/943,154

(22) Filed: Aug. 30, 2001

(65) Prior Publication Data

US 2002/0026873 A1 Mar. 7, 2002

Related U.S. Application Data

(60) Provisional application No. 60/228,978, filed on Aug. 30, 2000.

(51) Int. Cl.$^7$ .......................... B01D 50/00; B01D 45/08
(52) U.S. Cl. .............................. 95/14; 95/198; 95/221; 95/227; 95/272; 96/358; 96/417; 96/420; 55/DIG. 46
(58) Field of Search .......................... 96/355, 356, 358, 96/417, 420; 55/DIG. 46; 95/14, 198, 216, 221, 227, 272

(56) References Cited

U.S. PATENT DOCUMENTS

| | | | |
|---|---|---|---|
| 1,117,309 A | * 11/1914 | Bentz | 261/111 |
| 1,772,037 A | 8/1930 | Bradshaw | |
| 3,932,151 A | * 1/1976 | Lau | 118/326 |
| 3,977,714 A | 8/1976 | Trotter | |
| 4,061,478 A | 12/1977 | Hartwick | |
| 4,239,513 A | 12/1980 | Paul et al. | |
| 4,608,064 A | 8/1986 | Napadow | |
| 4,620,858 A | 11/1986 | Bradshaw et al. | |
| 4,687,686 A | * 8/1987 | Stofleth et al. | 118/326 |
| 4,885,010 A | 12/1989 | Rich et al. | |
| 4,927,437 A | 5/1990 | Richerson | |
| 4,955,990 A | 9/1990 | Napadow | |
| 5,018,909 A | 5/1991 | Crum et al. | |
| 5,223,141 A | 6/1993 | Brown et al. | |
| 5,352,257 A | 10/1994 | Powers | |
| 5,524,848 A | 6/1996 | Ellsworth | |
| 5,534,301 A | * 7/1996 | Shutt | 106/15.05 |
| 5,728,185 A | 3/1998 | Buchholz, Jr. | |
| 5,840,123 A | 11/1998 | Holbrook | |
| 5,873,945 A | 2/1999 | Patzelt et al. | |
| 5,882,522 A | 3/1999 | Matsumoto et al. | |
| 5,906,676 A | 5/1999 | Drummond | |
| 5,935,525 A | 8/1999 | Lincoln et al. | |

* cited by examiner

Primary Examiner—Robert A. Hopkins
(74) Attorney, Agent, or Firm—Waters Law Office; Robert R. Waters, Esq.

(57) ABSTRACT

This invention provides an improved method and apparatus for collecting a liquid overspray from a gaseous mist and separating the liquid from the gas stream. The invention has utility in a wide variety of chemical application processes such as to reduce the hazards and waste characterized by prior art methods and provide a mechanism for the in-line recycling of the overspray liquid. In a preferred embodiment, the present invention comprises a hooded recovery unit which is oriented above and about a conveyor system in which a workpiece travels through a spray zone in which a chemical or other liquid is applied to the workpiece. In such a situation, the present invention provides for the recovery of overspray liquid which would otherwise be wasted as the liquid or chemical is applied to the workpiece during the period in which the workpiece passes through the recovery unit. The system includes a spray application chamber, a conditioning chamber, and an overspray collection chamber. The overspray collection chamber functions by means of a series of evase wicking baffles oriented such as to turn the entrained air. Furthermore, the repeated transfer of the gas between sections of low velocity and sections of higher velocity at a controlled temperature near the condensation point serves to effectively separate the chemical from the air stream.

39 Claims, 9 Drawing Sheets

METHOD AND APPARATUS FOR SEPARATION AND RECOVERY OF A LIQUID FROM A GAS STREAM

CROSS REFERENCE TO RELATED APPLICATIONS

This application claims priority from U.S. provisional application 60/228,978, filed on Aug. 30, 2000. This application relates to a method and apparatus for the recovery of a liquid from a gas stream. The entire disclosure contained in U.S. provisional application 60/228,978, including the attachments thereto, is incorporated herein by reference.

STATEMENT REGARDING FEDERALLY SOPNSORED RESEARCH OR DEVELOPMENT

Not Application

BACKGROUND OF THE INVENTION

In the paper-making industry, in textile production, and in numerous other industrial enterprises, it is often desirable to provide a chemical treatment to a roll of fabric or other work product as it is being conveyed by a standard conveyor or other means. In order to chemically treat the fabric in question, often a processing plant will include a spray or aerosol-driven liquid chemical product for application directly on the fabric or work product as it moves along a conveyor system. Typically, the aerosol spray devices/nozzles are permanently mounted above or about the conveyor and the liquid is applied to the fabric as it moves along the conveyor system. The amount of chemical applied generally varies as a function of the velocity of the conveyor, the flow rate of the spray release and the transfer efficiency of the spray system.

As chemicals are applied to the conveyed work product, a frequent and persistent problem is the overspray of chemical waste produced by the system. In order to guarantee a thorough application of the chemical upon the work product, the spray nozzles typically output more chemical than is needed for the surface since the transfer efficiency is usually much less than one hundred percent. Accordingly, the excess chemical collects on the conveying equipment or factory floor below, or is exhausted with the air effluent creating numerous problems including disposal costs, housekeeping, and the cost of the wasted chemicals themselves. Depending on the properties of the chemical, there may also be attendant environmental hazards including degradation of the equipment and personnel safety concerns. For these reasons, it is important to minimize the amount of overspray and minimize the escape of overspray.

In many chemical applications, the overspray from the applied chemical can take the form of a vapor mist with finer dispersed droplets than typical sprayed liquids. In these situations, not only does overspray result in wasted chemical product below and about the processing equipment, but airborne overspray can also travel to surrounding equipment and facilities. In these situations, it is even more important to have an adequate means for collecting and disposing of chemical overspray.

Industrial plants have been wrestling with the problems described above for decades. Accordingly, the prior art is replete with many varieties of overspray collection systems and air/liquid separators for accomplishing this purpose, as well as a wide assortment of collection basins and other forms of dealing with chemical overspray. Generally speaking, the prior art systems are marginal depending upon the task called upon to perform, and some of the prior art devices create challenges or hazards of their own.

DESCRIPTION OF THE PRIOR ART

The prior art features a wide assortment of air filters and air/chemical separation devices that have been developed over the years. Many of the prior art devices are essentially fibrous filters which are used to trap solid particulates and/or liquid solvent for separation from a gas stream. For a finely atomized mist, such devices are not adequate.

U.S. Pat. No. 1,772,037 to Bradshaw features a plurality of centrifugal separators. The Bradshaw device applies a centrifugal force on a flowing moisture stream to separate liquid from a current of gas against a plurality of baffles. The baffles increase in curvature as the inner or outer ends are approached to enhance the centrifugal effect. Likewise, U.S. Pat. No. 3,977,714 to McIlvaine features a gas separation device in which contaminant particles are entrapped in liquid droplets which are then spun to form a film on a surface of a plate. The contaminants are then discharged.

U.S. Pat. No. 4,061,478 to Hartwick discloses a self cleaning smoke filter. The filter includes a channel with multiple longitudinal sides angularly disposed, an inlet port for receiving gaseous emissions and an outlet port. The filter also contains a spraying means for producing a cleansing spray inside the channel.

U.S. Pat. No. 4,239,513 to Paul features a device for separating foreign particulates from a gas flow. The device uses wall plates to deflect the gas flow, subjecting the flow to a centrifugal force such that the foreign particulates are collected on the wall plates. The device contains spirally curved laminae to define passageways. Nozzles are arranged to feed moisture into the fluid flow to assist wet separation. While somewhat analogous to the present invention, the Paul device relies on the introduction of a water stream and a reversal of flow to form a secondary vortex to pull a film of fluid back into air suspension to mix with the solids and again be deposited on the wall plates as gas travels through the exit passages. Such a system is far more complicated and prone to error than the present system.

U.S. Pat. No. 5,906,676 to Drummond is an ejector-augmented overspray reclaim system. Drummond is directed to separating and reclaiming oversprayed powder from a powder coating spray system. In accordance with Drummond, the overspray collection system includes a trough located under a conveyor belt and an inlet passageway in fluid communication with the interior of the spray booth. A collection subsystem creates sub-ambient air flow in the inlet passageway. A rotating brush dislodges overspray articles from the conveyor. An airflow through a conduit is created by a rotating fan wheel in the collection subsystem, and the airflow is augmented by a compressed air injector that is disposed and oriented in the conduit such that it ejects compressed air in the direction of the inlet passageway. Accordingly, particulate matter settling in the trough becomes entrained in an airstream flowing into a collection subsystem. The collection subsystem includes a cyclone separator and a filter stack.

While the Drummond device is instructive, the present device features substantial innovations and improvements over Drummond. First of all, Drummond uses a rotating brush to move particulate matter to the bottom of the trough which is not necessary in the present invention. Furthermore, the use of an abrasive instrument would result in the tearing or at least scoring of a textile product, and hence, is not useful for many applications. In addition, Drummond features a compressed air injector for creating an air flow; such a subsystem is both unnecessary and counterproductive in the present device. The present device is dependant largely on a gradual or slow-velocity movement of the gas through the collection system. A compressed air injection system such as that featured in Drummond would introduce a turbulence that would frustrate the purposes of this invention.

SUMMARY OF THE INVENTION

The object of this invention is to provide an improved method and apparatus for the collection of a liquid from an overspray mist in a wide variety of manufacturing processes. Usage of this invention reduces the hazards and waste characterized by prior art methods, and provides a method and apparatus for the in-line recycling of applied liquids. In the preferred embodiment, the liquid overspray may be a chemical additive which is gas-entrained for direct application to a workpiece. The workpiece may be a paper product or a textile product, and will generally be in sheet form although other arrangements are possible. In order to achieve this objective, the present invention comprises a hooded recovery unit which is oriented above and about a conveyor system or other manufacturing line or process such that the liquid or chemical application upon the workpiece is achieved during a period in which the workpiece passes through the hooded recovery unit. The hooded recovery unit will hereafter be denoted and described as the "spray application chamber". In this preferred embodiment, the process is a conveyor oriented such that it carries or secures the workpiece and passes through the spray application chamber. However, it is also possible that the process disclosed herein could be adapted to use in a stationary system in which the workpiece article(s) or sheet(s) is placed into the spray application chamber in batch-style processing.

In the preferred embodiment, a conveyor is arranged such as to orient the workpiece vertically through a processing chamber of a manufacturing process. Spray nozzles are oriented on one or both sides of the workpiece to direct a spray onto the workpiece from the side as it travels through the system. The conveyor system may also be arranged in any number of other manners including horizontal orientation of the workpiece. Furthermore, the conveyor system could be a standard belt or mesh-type conveyor, or it could be a cable or chain system with hooks or other means for attaching the workpiece to the conveyor.

As the workpiece passes through the recovery system, a gas-entrained liquid or chemical mist is applied to the workpiece, and the overspray invariably permeates the air within the walls of the spray application chamber. The ambient air in this vicinity may be heated by means of an electric resistance heater mounted in the chamber. A second chamber, a conditioning chamber, heats, cools, or otherwise processes ambient air to an appropriate temperature to suit the application, and an exhaust fan applies a low pressure vacuum to the conditioned air to move it into the surrounding walls of the spray application chamber. The conditioned air and liquid-permeated primary gas stream are moved by the same low pressure vacuum from the spray application chamber into a third chamber, a collection chamber which features a myriad of evase wicking baffles. The collection chamber of the recovery unit is also characterized by a reduction in the temperature of the conditioned air to approximate the dew point for the chemical or applied liquid. This area of the recovery unit is also characterized by specific air velocities and temperatures (which are dependent upon the nature of the liquid being removed) to maximize the efficiency of the evase wicking baffles.

The temperature in the overspray collection chamber is monitored electronically and adjusted accordingly to keep the conditioned air temperature within a few percentage points of the desired temperature. For waxy materials that are solid at room temperature, the chamber walls must stay above the melt point to maintain a flowable liquid for continuous recovery of reusable chemical. For finely atomized materials that are liquid at room temperature, the temperature of the chamber can be maintained at values to maximize droplet fall-out and coalescing in order to achieve maximum efficiency.

As the chemical mist travels through the overspray collection chamber, the chemical mist will settle and collect on said wicking baffles and the chemical will be gravity collected in one corner or other area of the chamber. Air velocity in the overspray collection chamber will be low with only enough pressure to keep the mist slightly moving. After separation of the liquid from the gas stream (usually air), the now clean air passes through a series of one or more conventional air filters to remove particulates such as paper dust, and is exhausted to the ambient factory floor or to the atmosphere.

A primary objective of the present invention is to provide a liquid recovery system that is both durable and flexible enough to be used in a wide assortment of chemical application systems. The device must also withstand physical and environmental challenges such as moisture, including acidic moisture, and around-the-clock usage.

Yet another objective of this invention is to create a liquid recovery system which is inexpensive to manufacture, inexpensive to install, and which increases the life-expectancy of the ancillary conveying equipment. In addition, a further objective of this invention is to create a liquid recovery unit that does not require frequent maintenance or replacement of component parts or dry filters. This invention achieves those objectives. Specifically, it is estimated that the apparatus disclosed in this invention would reasonably have a life-expectancy in excess of 25 years.

Another primary objective of the present invention is to provide an apparatus that is easy to transport into location in a variety of factory settings. Accordingly, this invention serves to reduce both the assembly cost and operations cost, saving valuable personnel resources.

Another primary objective of this invention is to provide a chemical recovery unit that does not itself create environmental hazards such as high heat, high velocity air flow, or noise concerns which would limit its applicability in some circumstances. The present device achieves these purposes entirely.

Another primary objective of the present invention is to provide an on-line, continuous recovery and recycle system for spray applied chemicals. Applicators will be able to recognize all the benefits of spray processes without suffering the direct and indirect costs of inherent spray inefficiencies.

As discussed above, the method and device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in following description or illustrated in the drawings. The invention is capable of other embodiments and of being practiced and carried out in various ways. Also, it is to be understood that the phraseology and terminology employed herein are for the purposes of description and should not be regarded as limiting.

Accordingly, those skilled in the art will appreciate that the conception upon which this invention is based may readily be utilized as a basis for the design of other structures, methods, and systems for carrying out the several purposes of the present invention. It is important, therefore, that the claims be regarded as including such equivalent constructions in so far as they do not depart from the spirit of the present invention.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the invention of the application, nor is it intended to be limiting to the scope of the invention in any way.

BRIEF DESCRIPTION OF THE DRAWINGS

Additional utility and features of this invention will become more fully apparent to those skilled in the art by reference to the following drawings, wherein all components are designated by like numerals and described more specifically.

DETAILED DESCRIPTION OF THE INVENTION

The invention claimed herein can be used to separate a variety of liquids from a gaseous stream, and accordingly, has utility in the recovery of a wide assortment of additives or chemicals. The present invention has particular utility in the preparation of paper materials and other textiles in which softening agents or other chemical additives are added to the workpiece to soften or treat the surface of the workpiece or otherwise alter surface properties. The preferred embodiment discussed herein is directed to recovery of overspray chemical material in a production system in which the workpiece is a paper product treated with a chemical additive.

Surface treatment of paper products is a critical task in the paper industry as the physical qualities concerning the paper are paramount to the end consumer and often encompass significant engineering challenges. As used herein, "paper products" is understood to include any sheet material that contains either natural or synthetic fibers, including cellulosic fibers, wood fibers, cotton fibers, and synthetics such as rayon, nylon, fiberglass, or others. With all such materials, the paper making process inherently includes the application of softening, whitening, or other chemical agents to alter surface properties. The end products are varied and include such staples of mainstay life as writing paper, printing paper, tissue paper, cardboard, packaging paper, wrapping paper, paper bags, paper cloths, paper filters, and disposable linens.

One such papermaking application that generates a considerable amount of overspray challenges is the creation of soft tissue papers. In such a manufacturing system, chemical additives are directed to the workpiece (i.e. untreated paper) to alter surface qualities including softness. Among the most common end products of the tissue line, notable household staples dominate including sanitary tissues, toilet tissues, facial tissues, medicated tissues, napkins, paper cloths, and numerous others.

The present invention also has particular utility in the manufacturing of textile products. As used herein, "textile products" include clothing, household textiles such as sheets and towels, carpeting, upholstery, and wall covering. Industrial textile products include filters, tents, conveyer material, fiber reinforcement material, and bulk military fiber. Quite often, textile products are treated during the manufacturing process to improve physical properties whether for apparel, home use, or industrial use. Such modifications may be chemical or mechanical in nature, and include shrinkage control, flame retardancy, weather resistance, softening, water proofing, and many others. As with paper production, a chemical additive is often applied to the textile as it travels through a conveyer system to enhance or alter some inherent property of the material.

Figure 1:
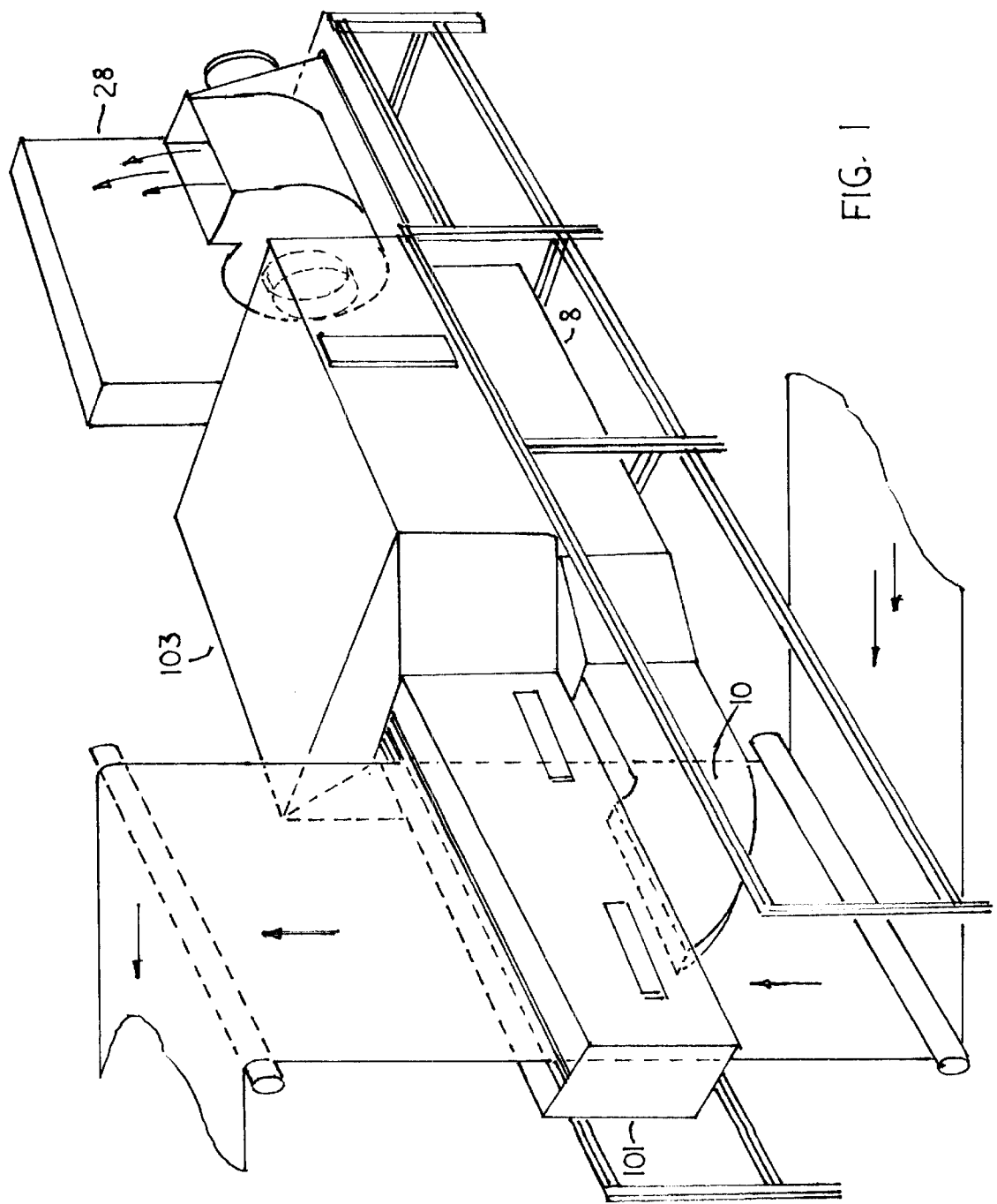
FIG. 1 is a perspective view of the preferred embodiment of the spray recovery unit of this invention shown with a sheet of paper (the workpiece) moving through the unit.

FIG. 1 shows the spray recovery unit 100 of the present invention which includes the following major components: a spray application chamber 101, a conditioning chamber 102, and an overspray collection chamber 103. In one preferred embodiment, the spray recovery unit 100 is approximately 16½ feet wide, 40½ feet long, and 20½ feet high, although the s scaled up or scaled down to fit the application needed.

Figure 2:
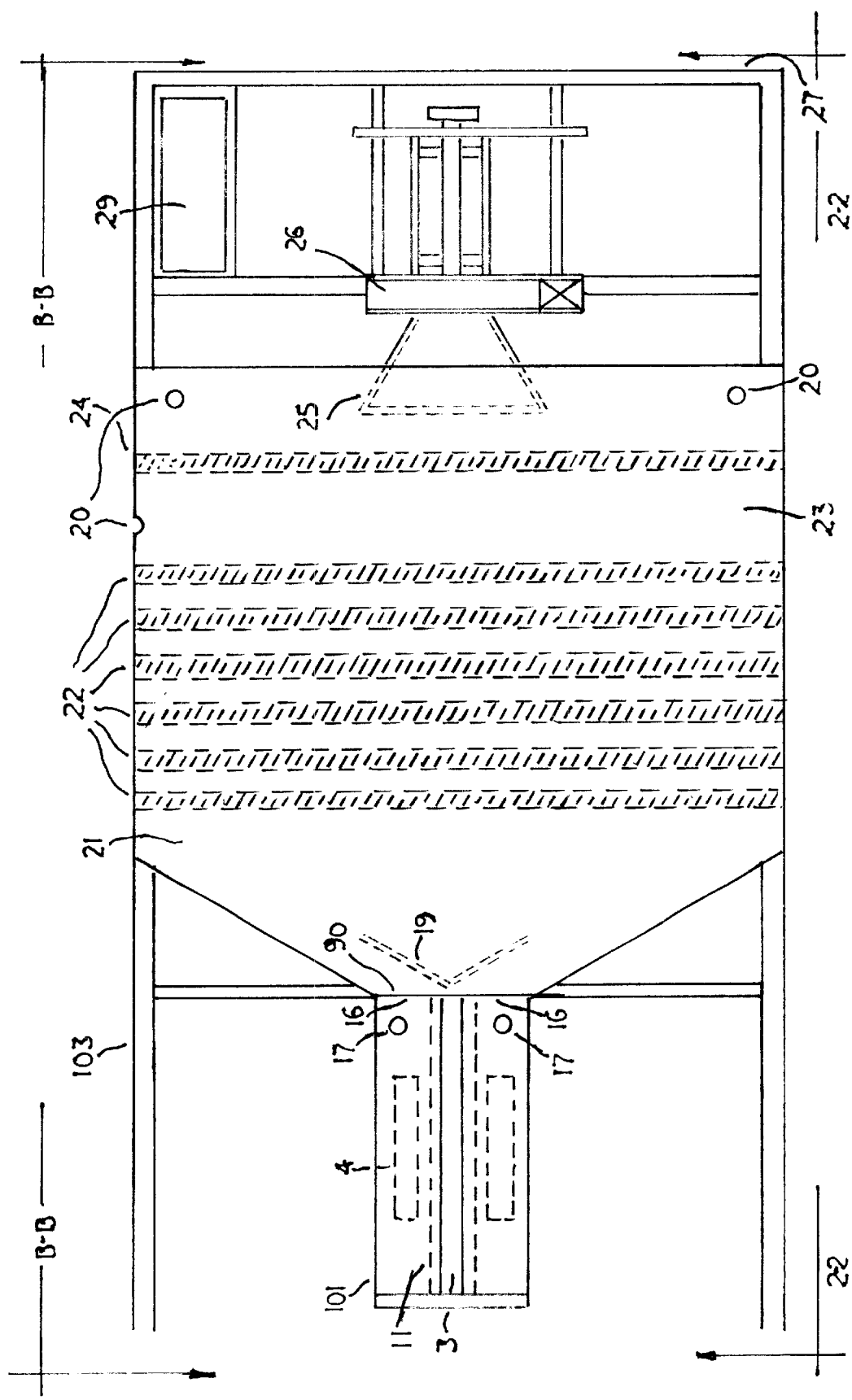
FIG. 2 is a plan view of the preferred embodiment of a spray recovery unit according to the present invention.
Figure 4:
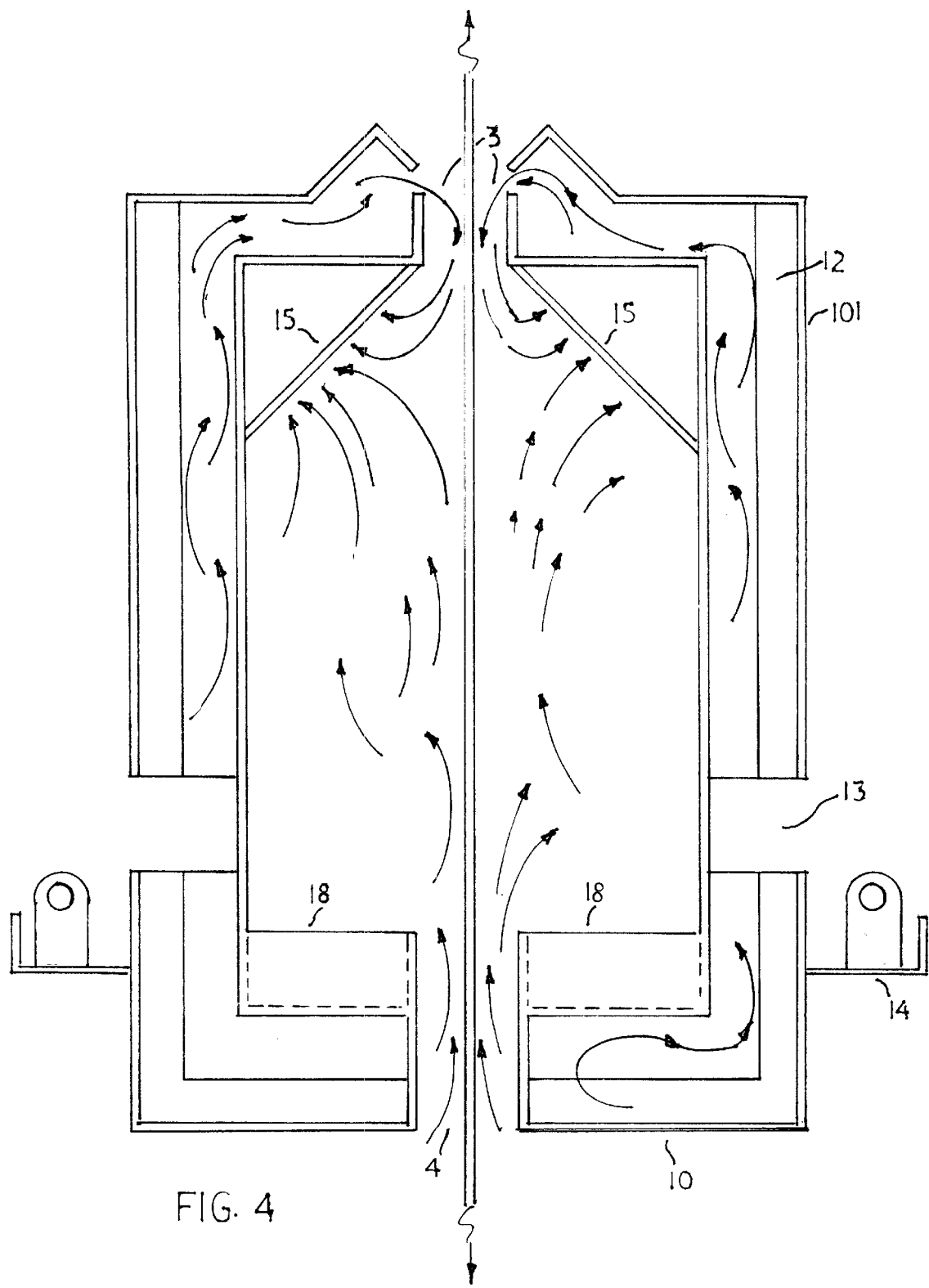
FIG. 4 is a sectional view of the spray application chamber taken along line "c—c" in FIG. 3.

The spray application chamber 101 is illustrated in FIG. 2 and the details for the spray application chamber are best illustrated in FIG. 4. Spray application chamber 101 includes essentially a hooded enclosure which can be made of a wide variety of materials and is optimally constructed of stainless steel, along with requisite openings for attachment of spray applicator mechanisms (not shown). Openings 3 and 4 represent the location of the workpiece. In this preferred embodiment, the spray application chamber 101 has openings 3 and 4 in the top and bottom of the chamber respectively, but other arrangements are also possible. Two opposite side walls are shown in FIG. 4.

The workpiece is supported by a conveyor, hook, roller assembly, or other assembly such as to enable the workpiece to pass vertically through the spray application chamber 101 as illustrated in FIG. 1. As a workpiece enters and exits the spray application chamber 101 through passageways 3 and 4 respectively, a small amount of air intake is also present at this location. The amount of air intake present at this location will depend, in large part, on the operation of air intake dampers at other locations in the present invention as will be described later.

Figure 5:
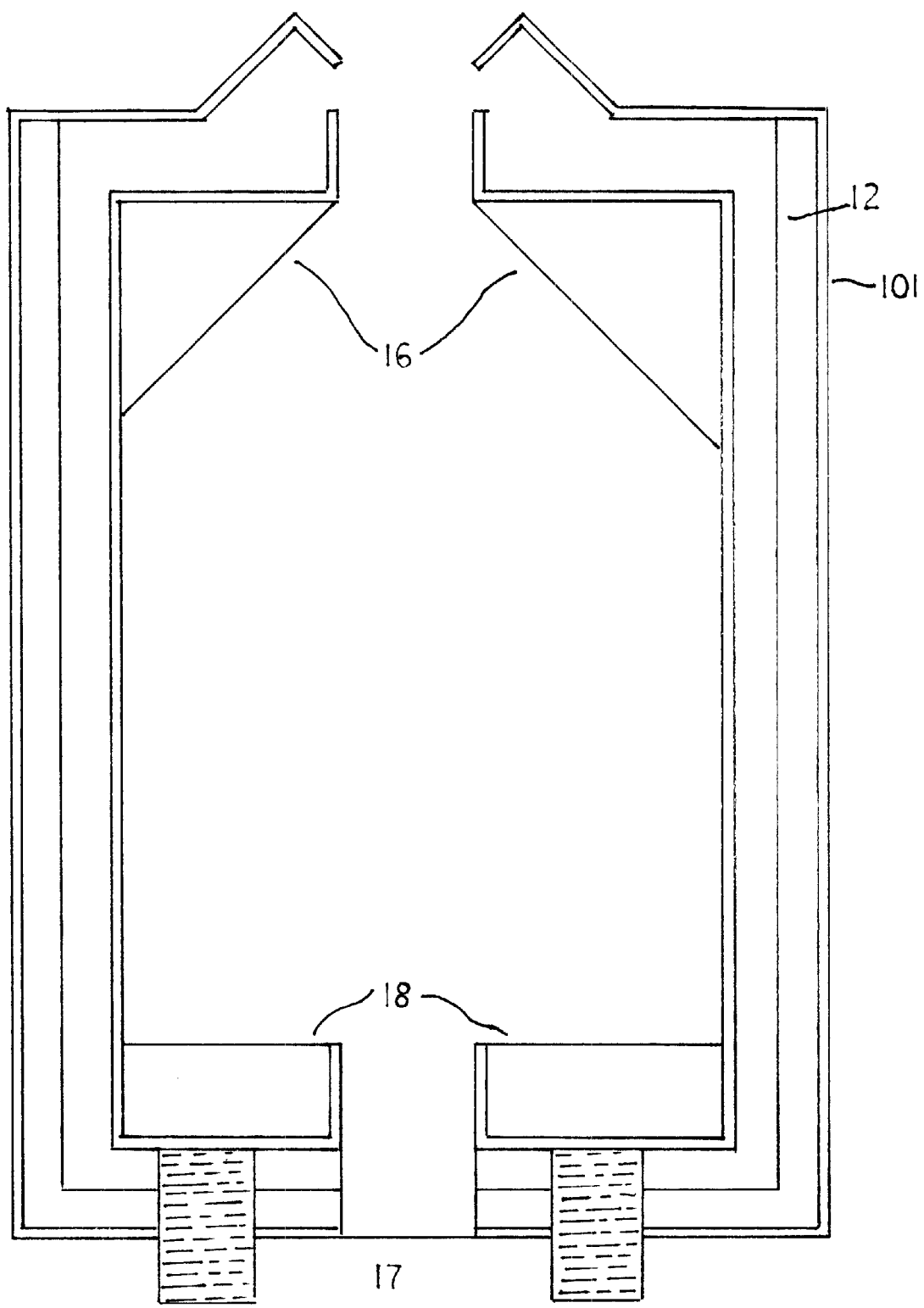
FIG. 5 is a sectional view of the spray application chamber taken along line "d—d" in FIG. 3 showing the composition of the chamber at a point beyond the location of the spray nozzles.

The spray application chamber 101 is insulated with approximately one inch of conventional insulation 12 applied between two layers of wall material, preferably stainless steel. As further shown in FIG. 4, the spray application chamber 101 includes openings 13 for mounting chemical spray application devices such as spray guns (not shown). Optimally, the spray application chamber 101 will include four (4) or more openings 13 for mounting spray application devices. Brackets 14 may also be mounted as shown in FIG. 4 for holding or controlling the spray application devices. The spray application chamber 101 also includes equalizing air flow regulators 15 located in the top right and the top left corners of the chamber and are needed to facilitate a proper distribution of air flow. As shown in FIG. 5, the air flow regulators 15 include openings 16 for permitting air flow into the overspray collection chamber 103.

As illustrated in FIG. 4 and FIG. 5, the spray application chamber 101 includes two (2) sloped drain pans 18 located in the floor of the chamber. These sloped drain pans enable liquid overspray that has condensed and fallen to the floor of the spray application chamber 101 to be drained for collection and recovery. Two 1½ inch diameter drains 17 are shown in FIG. 5 and also shown in FIG. 2 and FIG. 3. Some of the gas-entrained liquid spray to be applied may be deflected by workpiece 11 or may miss the workpiece altogether due to the wide angle of deflection of the spray gun, and may accordingly not be deposited on the workpiece. As described herein below, this oversprayed material may fall to the bottom of the unit in liquid form or may continue entrained in air, in which circumstances, it would need to be subsequently separated for disposal or reuse. Accordingly, drains 17 are located at the lowest elevation of sloped drain pans 18 to collect any liquid overspray present at this point in the process.

Figure 3:
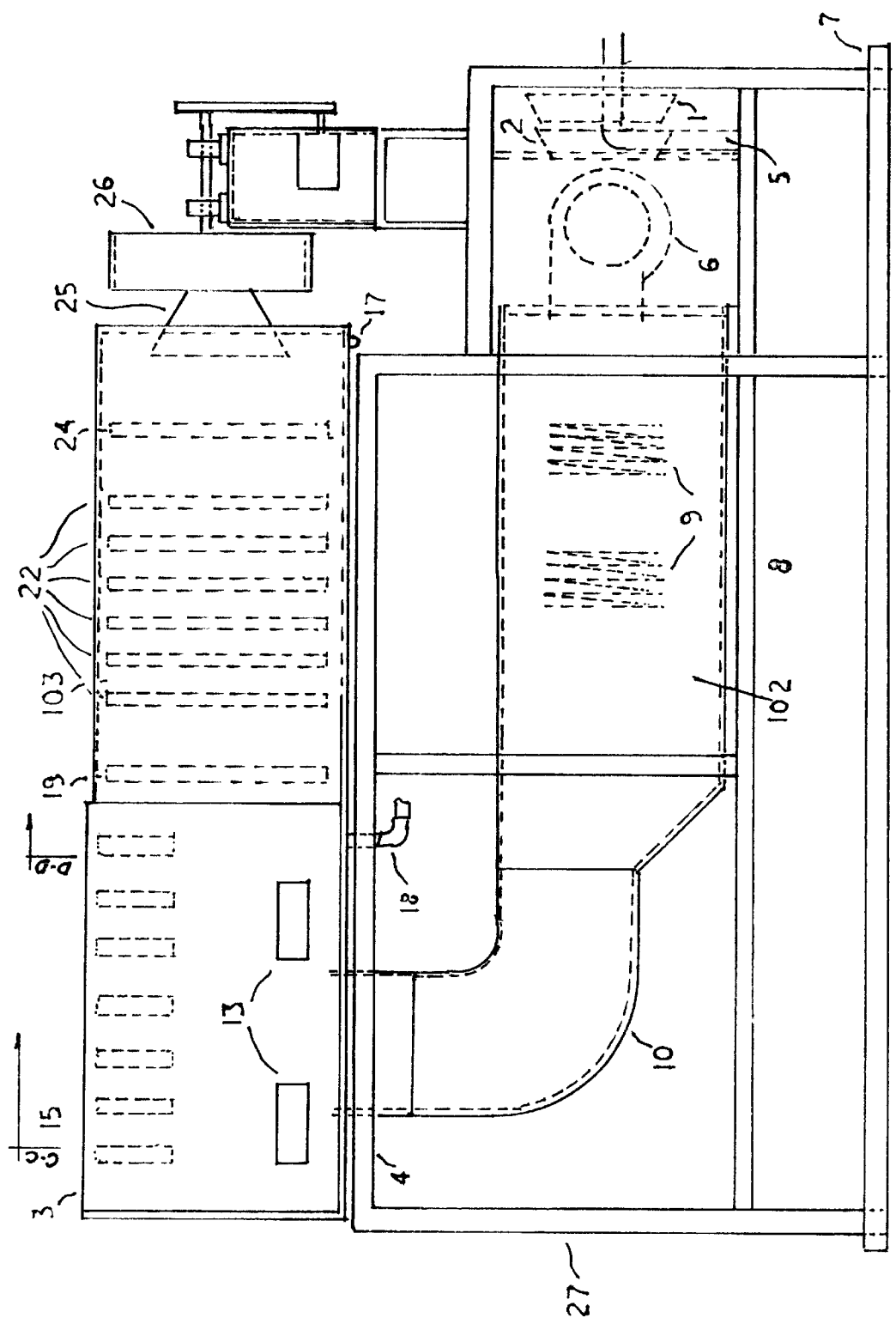
FIG. 3 is a side view of the preferred embodiment taken along line "a—a" in FIG. 2.

FIG. 3 is a side elevation drawing of the spray recovery unit of the present invention and shows significant detail concerning a preferred arrangement for the conditioning chamber 102. In proper operation, air enters this chamber through opening 2 as shown in FIG. 3 and travels through the chamber. However, displaced in the center of opening 2 is control air intake damper 1 which is fully adjustable such as to reduce or increase the intake of ambient air into the system. After air enters the conditioning chamber 102 through opening 2, it is first cleaned by filter 45 which may be any type of conventional air filter such as a furnace filter or the equivalent. This filter serves to remove any solid or liquid contaminant from entering the unit, such as insects, paper dust or other airborne fibers and debris. After filtering, the intake air encounters air blower 6 which is optimally 500 CFM to 2000 CFM and disposed in the center of the conditioning chamber 102. As shown more fully in FIG. 6, the air blower is fully accessible to the outside for maintenance by means of access door 7.

The central duct of conditioning chamber 102, shown as numeral 8 in FIG. 3, is a standard metal housing (preferably stainless steel) with 1 inch insulation in the walls of the unit in order to retain heat to the inside as well as to protect the ambient air outside the unit from excess heat. As shown in FIG. 3 and more fully in perspective view in FIG. 7, one or more electric heaters 9 are disposed in conditioning chamber 102 at the approximate location shown. Optimally, heaters 9 are 15 kW electric heaters, but other sizes may also be used. As the air is heated by heaters 9, it is conveyed by blower 6 into ductwork 10 which is also characterized as a standard metal ductwork with 1 inch insulation on all walls.

As shown in both FIG. 3 and FIG. 4, ductwork 10 is fixably attached to the bottom of the spray application chamber 101 such as to convey heated air from conditioning chamber 102 into the sealed walls of the spray application chamber in the location shown in FIG. 4. As indicated by the arrow in FIG. 4, the heated air enters the interior spray chamber walls and travels through the chamber such that it enters the spray application chamber from the top through air flow intake openings 16. Importantly, by circulating heated air on essentially all four sides of the spray application chamber before introducing the air into the top of the spray application chamber 101, this method and device helps create uniformity in both the heated air and in the air temperatures and surface temperatures inside the spray application chamber 101.

FIG. 2 shows a plan view of the overspray collection chamber 103. The mixture of heated air and overspray chemical product enters the overspray collection chamber 103 at the approximate location 90 as shown in FIG. 2. Upon entering overspray collection chamber 103, the overspray-entrained air first encounters airflow baffle 19. Baffle 19 helps to disperse the overspray-entrained air to the far reaches of the overspray collection chamber 103. At this point, the overspray-entrained air enters a wider open area in the overspray collection chamber designated generally by 21 in FIG. 2. In this section of the chamber, the overspray-entrained air experiences a marked reduction in velocity as a result of the substantial increase in volume of the chamber.

Beyond this area of low velocity flow, the overspray-entrained air next encounters the evase wicking baffles generally shown as 22 in FIG. 2. Evase wicking baffles 22 are generally constructed of stainless steel or a suitable substitute, and are arranged as shown more fully in detail drawing FIG. 8. The baffles 22 are characterized generally as a series of semi-rectangular members arranged in opposing directions. The baffles 22 may alternatively be arcuate in general shape. As shown by the arrows indicated in FIG. 8, overspray-entrained air encounters wicking baffles 22 and is funneled between the baffles into an opposing baffle as shown. Accordingly, overspray-entrained air is forced to make two (2) approximately 180 degree turns in the space within the first series of evase wicking baffles 22. The specific distance between the opposing members of the wicking baffle set can vary but is approximately ½ to 1 inch.

After encountering the first set of evase wicking baffles 22, the overspray-entrained air enters an area approximately 2 or more inches in depth during which no wicking baffles are disposed. Next, the overspray-entrained air enters another set of two opposing evase wicking baffles 22 and again is forced to make two (2) approximately 180 degree turns before exiting the baffle assembly and facing the original direction of air flow. Another two (2) or so inches of open space is encountered before the next series of wicking baffles 22. The specific number of baffle assemblies may vary, depending upon the flow rate of the chemical and the particle size of the droplets.

In terms of functionality, the series of evase wicking baffle arrangements 22 serves to turn and mix the overspray-entrained air while at the same time greatly varying the velocity of the air between the low velocity open areas of the chamber and the higher velocity turning required to move through the various wicking baffle 22 sets.

In addition to the controlled changes in velocity between higher and lower velocity air flow in the overspray collection chamber 103, care is taken to monitor the ambient temperature in said collection chamber 103. For optimal use of this invention, the temperature controlled in the overspray collection chamber 103 should be the optimum temperature of the coalescing and recovery of the liquid chemical applied to the workpiece, and for which recovery is sought. By controlling not only the air intake damper but also the operation of the air heater, the temperature in the overspray collection chamber can be tightly regulated. As overspray-entrained air encounters dramatic changes in velocity as well as twists and turns of direction caused by the opposing wicking baffles 22, collection of the overspray is optimized.

As air flow continues through the evase wicking baffle sets 22, more and more overspray is recovered. Next, after proceeding through the entirety of wicking baffle 22 sets, the air encounters another area of low velocity flow identified by 23 in FIG. 2. The air flow then encounters another conventional air filter 24 which, like filter 5, can be essentially any conventional air filter which can withstand the temperature or chemical composition to be encountered, but will still function to filter any remaining residue.

At this point, the air flow encounters fan intake 25 which can be, for example, approximately 7 inches diameter to 12 inches diameter in transfer and approximately 6 inches long. The fan intake funnel serves to move the filtered air into blower 26 which can be approximately 500 to 2000 CFM for final exhaust of the filtered air.

Figure 6:
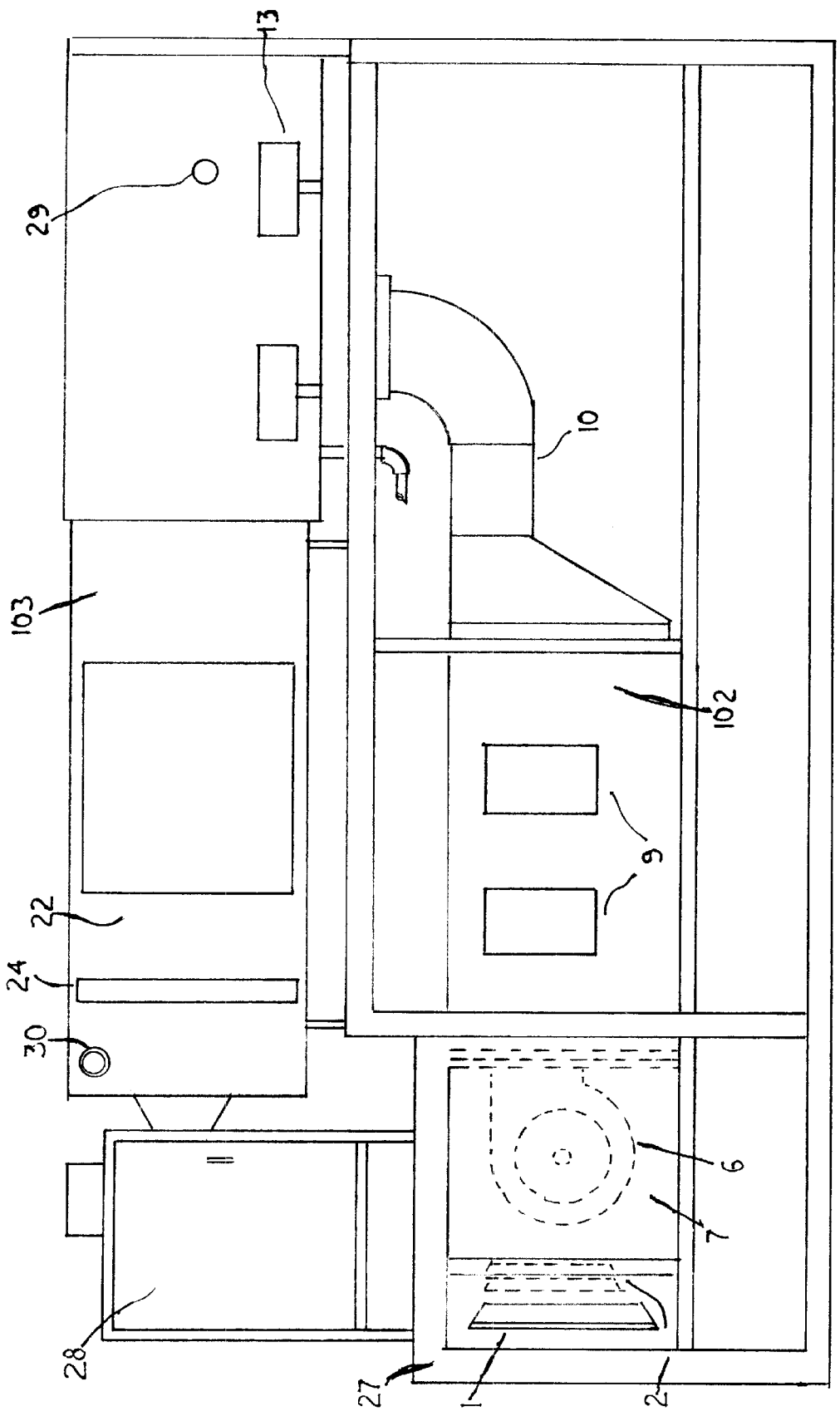
FIG. 6 is a side view taken along line "b—b" in FIG. 2 and represents the opposite side of the spray recovery unit in relation to FIG. 3.
Figure 7:
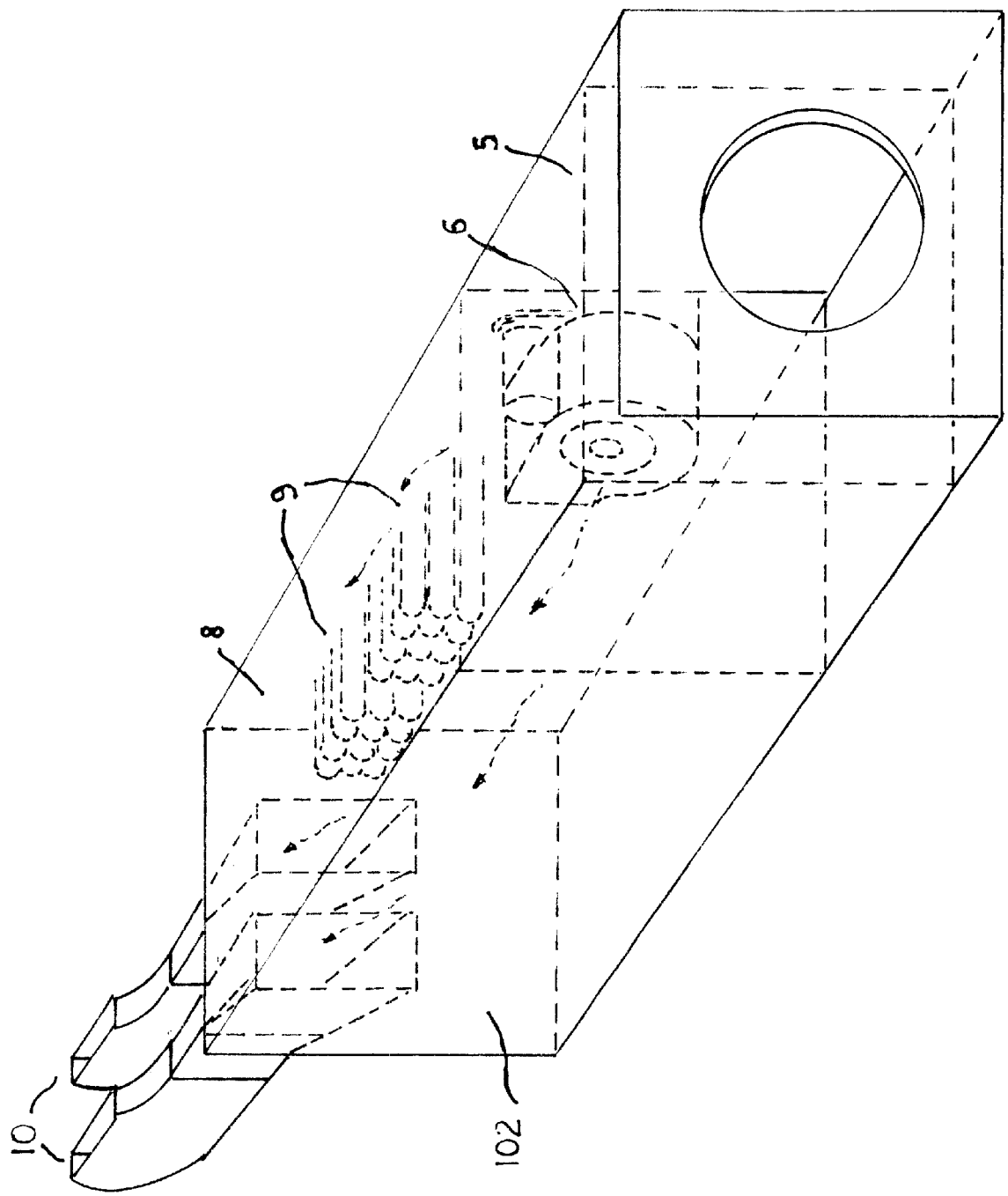
FIG. 7 is a perspective view of the conditioning chamber with fan and heating units shown in broken lines for clarity.
Figure 8:
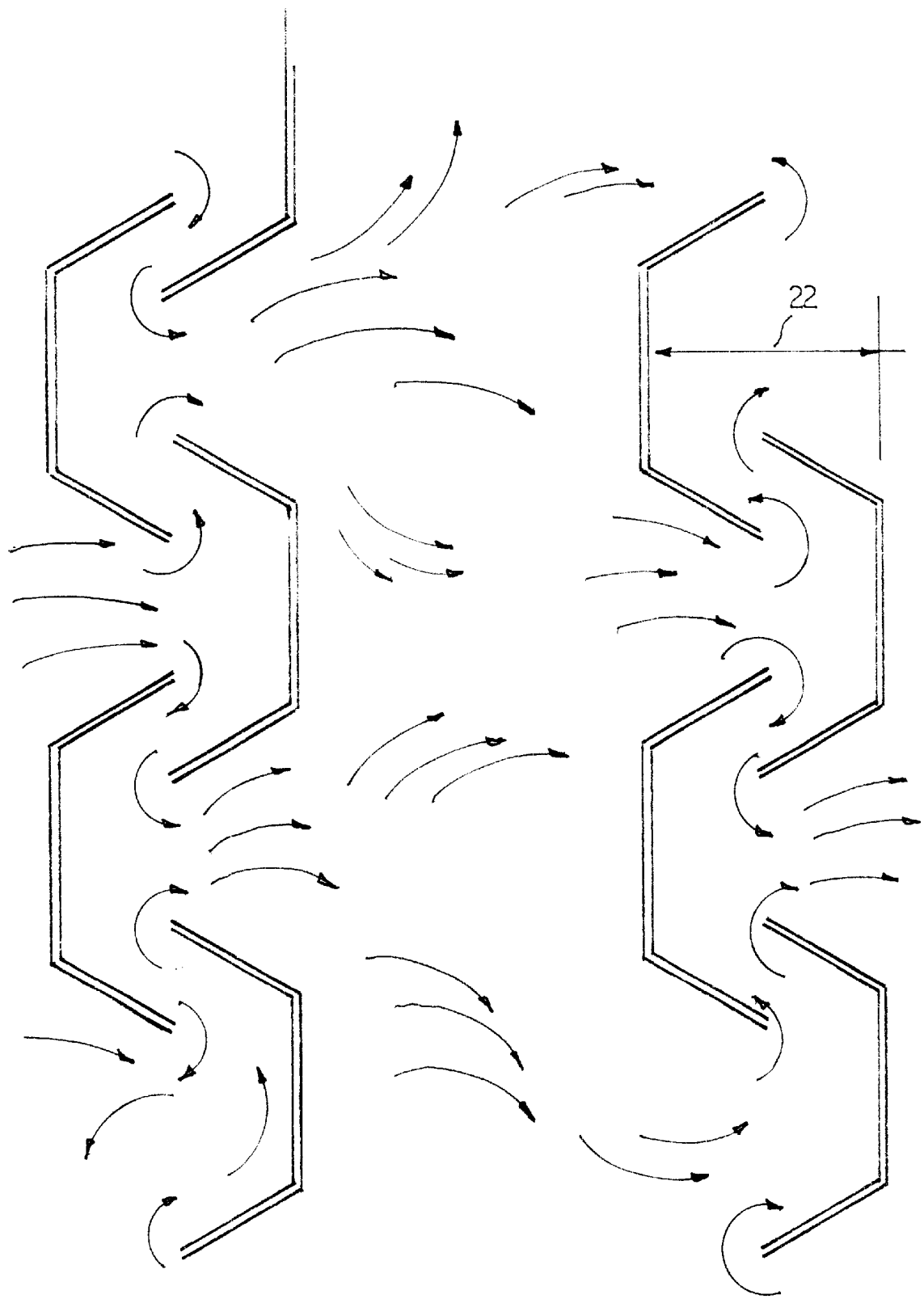
FIG. 8 is an enlarged detail plan view of the evase wicking baffles depicted as item 22 in FIG. 2.
Figure 9:
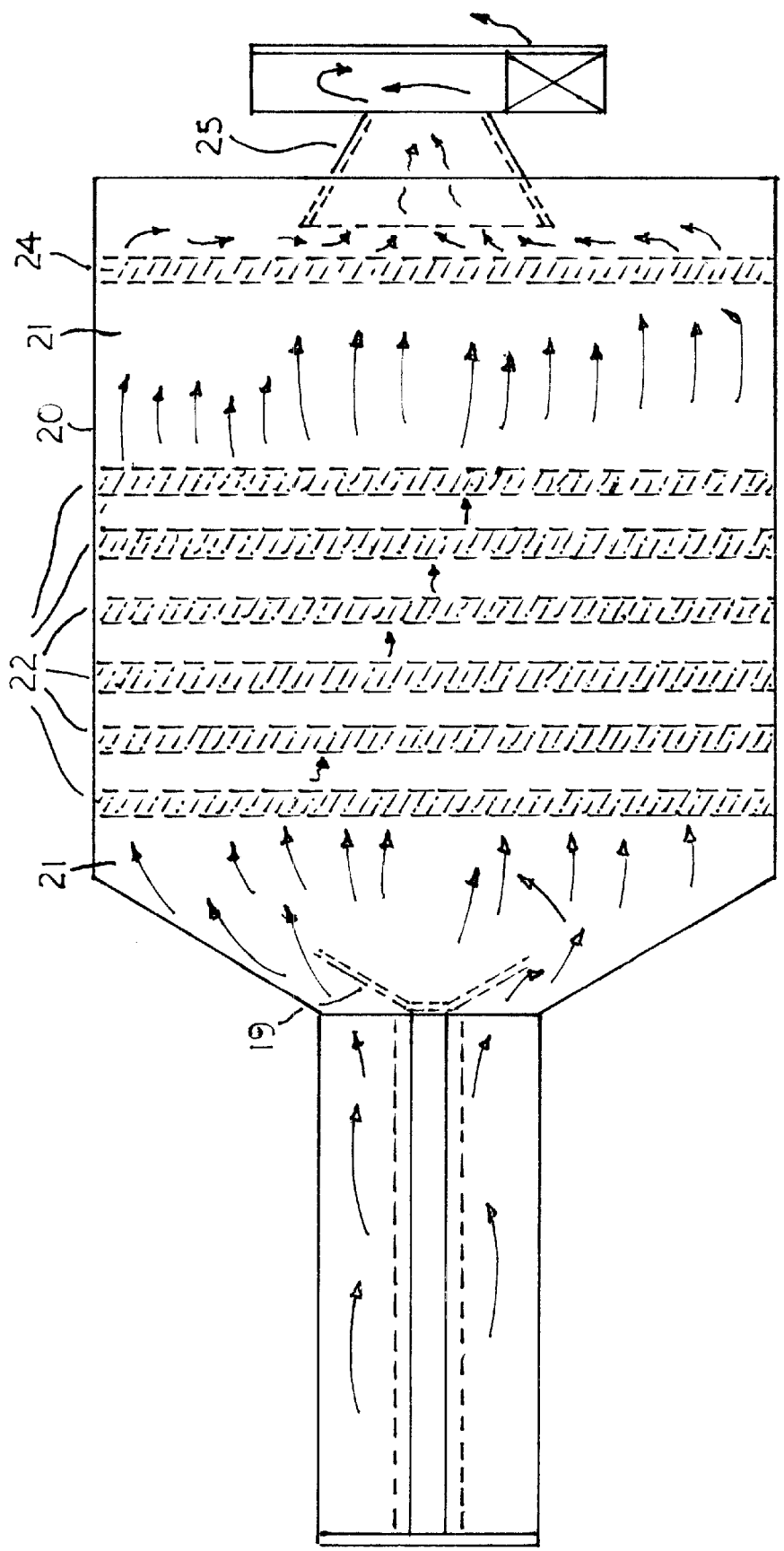
FIG. 9 is a plan view diagram of the overspray collection chamber and wicking baffles showing the anticipated air flow through the chamber.

Overall control of the operational parameters of the system may be achieved by conventional control techniques. As shown in FIG. 2, the power supply may be, for example, a 200 Ampere, 240 Volt AC power supply 28 which can be located in any number of locations such as that shown in FIG. 2. In addition, varister-type temperature control mechanisms may be used for the electric heaters and those may be located as shown in FIG. 6 at location 29 and 30 respectively.

What is claimed is:

1. A method of recovering a liquid overspray from a gas stream in a manufacturing process in which a gas-entrained liquid is applied to a workpiece, said method comprising:
    a. orienting a hooded spray application chamber above or about said manufacturing process for collection of said gas-entrained liquid overspray;
    b. introducing air which has been conditioned to a temperature above the condensation temperature of said liquid into said spray application chamber; and then
    c. moving the mixture of said conditioned air and said gas-entrained liquid overspray stream into an overspray collection chamber wherein said gaseous stream alternately passes through one or more zones of low velocity movement and higher velocity movement whereby said liquid is separated from said air stream.

2. The method of claim 1 wherein said gas which is entrained in said liquid overspray is air.

3. The method of claim 1 wherein said gas which is entrained in said liquid overspray is carbon dioxide or a fluorocarbon-based gas.

4. The method of claim 1 in which said liquid is a substance which is a solid at ambient room temperature.

5. The method of claim 1 in which said liquid is a substance which is solvent-free.

6. The method of claim 1 wherein said manufacturing process comprises a conveyer system.

7. The method of claim 1 wherein said manufacturing process comprises a stationary chamber or batch processing system.

8. The method of claim 1 wherein said workpiece is paper, a textile product or a flexible sheet material.

9. The method of claim 1 wherein said workpiece is a flexible sheet material containing paper fiber or is paper.

10. The method of claim 1 wherein said workpiece is a flexible sheet material containing paper fiber and is a tissue paper product.

11. The method of claim 10 wherein said tissue paper product is selected from the group consisting of sanitary tissues, household tissues, industrial tissues, facial tissues, cosmetic tissues, absorbent tissues, medicated tissues, toilet paper, paper towels, paper napkins, paper cloths, paper linens, and diaper material.

12. The method of claim 1 wherein said temperature of said conditioned air is maintained at a temperature greater than 0% and up to and including 25% higher than the condensation temperature of said liquid overspray.

13. The method of claim 1 wherein said air which has been conditioned to a temperature above the condensation temperature of said liquid has been conditioned by means of a conditioning chamber which includes:
    a) a heating means for altering the temperature of said gas stream;
    b) a temperature sensing means disposed within said conditioning chamber; and
    c) a feedback and control means in communication with both said temperature sensing means and said heating means for regulating the operation of said heating means in response to said communication.

14. The method of claim 1 wherein said overspray collection chamber is constructed such that said zones of higher velocity gas movement are achieved by a means of restricting the volume of said overspray collection chamber in specific limited regions of said overspray collection chamber.

15. The method of claim 14 wherein said means of restricting the volume of said overspray collection chamber in said specific limited regions of said overspray collection chamber is accomplished by utilizing evase wicking baffles.

16. A recovery system for recovering a liquid overspray from a gas stream in a manufacturing process in which a gas-entrained liquid is applied to a workpiece, said recovery system comprising:
    a. a hooded spray application chamber oriented above or about said manufacturing process for collection of said gas-entrained liquid overspray;
    b. a conditioning chamber for maintaining or altering the temperature of an air stream to a temperature above the condensation temperature of said liquid before introduction of said air stream into said spray application chamber containing said gas-entrained liquid overspray; and
    c. an overspray collection chamber within which said gas-entrained liquid overspray is moved and wherein said gaseous stream alternately passes through one or more zones of lower velocity movement and higher velocity movement.

17. The recovery system of claim 16 wherein said gas which is entrained in said liquid overspray is air.

18. The recovery system of claim 16 wherein said gas which is entrained in said liquid overspray is carbon dioxide or a fluorocarbon-based gas.

19. The recovery system of claim 16 wherein said liquid is a substance which is a solid at ambient room temperature.

20. The recovery system of claim 16 wherein said liquid is a substance which is solvent-free.

21. The recovery system of claim 16 wherein said manufacturing process comprises a conveyer system.

22. The recovery system of claim 16 wherein said manufacturing process comprises a stationary chamber or a batch processing system.

23. The recovery system of claim 16 wherein said workpiece is paper, a textile product or a flexible sheet material.

24. The recovery system of claim 16 wherein said workpiece is a flexible sheet material containing paper fiber or is paper.

25. The recovery system of claim 16 wherein said flexible sheet material contains paper fiber and is a tissue paper product.

26. The recovery system of claim 25 wherein said tissue paper product is selected from the group consisting of sanitary tissues, household tissues, industrial tissues, facial tissues, cosmetic tissues, absorbent tissues, medicated tissues, toilet paper, paper towels, paper napkins, paper cloths, paper linens, and diaper material.

27. The recovery system of claim 16 wherein said spray application chamber is constructed of stainless steel.

28. The recovery system of claim 16 wherein said conditioning chamber is constructed of stainless steel.

29. The recovery system of claim 16 wherein said conditioning chamber comprises:

a) a heating means for altering the temperature of said gas stream;

b) a temperature sensing means disposed within said conditioning chamber; and c) a feedback and control means in communication with both said temperature sensing means and said heating means for regulating the operation of said heating means in response to said communication.

30. The recovery system of claim 16 wherein said overspray collection chamber is constructed such that said zones of higher velocity air movement are achieved by a means of restricting the volume of said overspray collection chamber in specific limited regions of said overspray collection chamber.

31. The recovery system of claim 30 wherein said means of restricting the volume of said overspray collection chamber in said specific limited regions of said overspray collection chamber includes the use of evase wicking baffles.

32. An overspray collection chamber for enhancing the condensation and collection of a liquid from a gaseous stream comprising:

a) a metal housing constructed such as to define a first and second opening wherein a gaseous stream enters said housing through said first opening and exits said housing through said second opening;

b) a means for monitoring and controlling the ambient temperature of gaseous stream to the approximate optimum condensation temperature of said liquid;

c) one or more zones within said housing wherein said gaseous stream is altered between a higher and lower velocity one or more times while said gaseous stream travels through said housing;

d) means for collecting the condensed liquid from said chamber for disposal or reuse.

33. The overspray collection chamber of claim 32, wherein said means for monitoring and controlling said ambient temperature of said gaseous stream includes temperature sensors or probes disposed within said overspray collection chamber and arranged to communicate with one or more heaters disposed within said overspray collection chamber.

34. The overspray collection chamber of claim 32, wherein said housing is constructed of stainless steel.

35. The overspray collection chamber of claim 32 wherein said zones of high velocity flow of said gaseous stream are achieved by physical barriers oriented within said overspray chamber arranged such as to reduce the volume of said chamber in each region in which a higher velocity flow is desired.

36. The overspray collection chamber of claim 35 of said physical barriers for restricting gaseous flow consist of evase wicking baffles.

37. The overspray collection chamber of claim 36 wherein said evase wicking baffles are constructed of stainless steel.

38. The overspray collection chamber of claim 36 wherein said evase wicking baffles are arcuate in general shape.

39. The overspray collection chamber of claim 36 wherein said evase wicking baffles are rectangular in general shape.

* * * * *